Patented Apr. 17, 1951

2,549,416

UNITED STATES PATENT OFFICE 2,549,416

PREPARATION OF ALCOHOLS

Richard E. Brooks, Wilmington, Del., assignor to E. I. du Pont de Nemours & Company, Wilmington, Del., a corporation of Delaware No Drawing. Application February 4, 1948, Serial No. 6,350

9 Claims. (Cl. 260—638)

This invention relates to a catalytic process for hydrogenating certain aliphatic aldehydes to the corresponding saturated alcohols.

The aldehydes which are hydrogenated according to this invention are those having the formula R—CHO, wherein R is an aliphatic radical of the class consisting of alkyl, alkenyl, and hydroxy-alkyl groups containing from 1 to 19 carbon atoms. Hydrogenation of these compounds converts the aldehydic group, —CHO, to the corresponding alcohol group, —CH$_2$OH. In the case of an unsaturated aldehyde i. e., where R is an alkenyl radical, the olefinic bond as well as the —CHO group is hydrogenated, so that the resulting compound is the corresponding saturated alcohol.

Various processes for hydrogenating aldehydes of this type have been suggested, some involving liquid phase operation and others involving vapor phase operation. Included among the catalysts which have been proposed for the vapor phase process are nickel, copper, copper promoted with silica, and the like. For commercial operations, however, these catalysts are all characterized by one or more shortcomings. They may be too active or not active enough, in either of which cases it is impossible to obtain high yields of the desired alcohol. Furthermore, their activity decreases rapidly during use, with the result that catalyst life is uniformly poor.

For purposes of illustration only, the process of this invention will be described with particular reference to the hydrogenation of certain branched-chain, nine-carbon aldehydes. These aldehydes are the ones obtainable by simultaneously reacting carbon monoxide and hydrogen at elevated temperatures and pressures with diisobutylene in the presence of a hydrogenation catalyst. As disclosed in copending application S. N. 758,477 of W. F. Gresham, R. E. Brooks and W. M. Bruner, filed July 1, 1947, the aldehydic product resulting from the foregoing carbonylation reaction consists largely of the compound, 3,5,5-trimethylhexanal (B. P. 170° to 171° C./760 mm., refractive index $n_D^{25°}$=1.4194±0.0010). Upon hydrogenation of this aldehydic product, there is obtained a corresponding mixture of branched-chain, nine-carbon alcohols. As shown in copending application S. N. 758,478 of Gresham, Brooks and Bruner, this alcohol mixture, in turn, contains a very large proportion of the compound 3,5,5-trimethylhexanol-1 (B. P. 190° C./760 mm.; refractive index, $$n_D^{25°}=1.4300\pm0.0007;$$

specific gravity, $$d\frac{25°\ C.}{4°\ C.}=0.823\ to\ 0.825$$

It is an object of this invention to provide a commercially feasible process for hydrogenating the above-described aldehydes of the formula R—CHO to the corresponding alcohols. A particular object of the invention is to provide a process for hydrogenating 3,5,5-trimethylhexanal to give high yields of the corresponding alcohol, 3,5,5-trimethylhexanol-1. Other objects will appear hereinafter.

According to the invention, it has been discovered that extremely high yields of alcohols are obtained when aldehydes of the formula R—CHO, wherein R is an aliphatic radical of the class consisting of alkyl, alkenyl, and hydroxyalkyl groups containing from 1 to 19 carbon atoms, are hydrogenated in the vapor phase by passing them together with hydrogen over a catalyst comprising reduced copper plus zinc oxide. The process may be carried out by passing the aldehyde, together with at least 5 mols of hydrogen per mol of aldehyde, at a temperature of from 100° to 300° C., at a pressure of at least about one atmosphere, and at a space velocity of from 3000 to 200,000 volumes of gas (total volume of aldehyde plus hydrogen at standard temperature and pressure) per volume of catalyst per hour, over a catalyst prepared by reduction of a mixture of copper and zinc oxides.

According to a preferred embodiment of the invention, the aldehydes which are hydrogenated are those obtainable by simultaneously reacting carbon monoxide and hydrogen with diisobutylene at elevated temperatures and pressures in the presence of a hydrogenation catalyst. When hydrogenating these branched-chain, nine-carbon aldehyde compounds, preferred operating conditions involve mol ratios of hydrogen:aldehyde in the range of from 15:1 to 60:1, temperatures within the range of from 150° to 250° C., pressures of from 200 to 600 pounds, space velocities of from 4,000 to 30,000, and catalysts containing a weight ratio of copper to zinc of about 1:2. For example, when a purified fraction consisting largely of 3,5,5-trimethylhexanal is hydrogenated in the vapor phase by passing it together with about 50 mols of hydrogen per mol of aldehyde, at a temperature of about 170° to 230° C., at a pressure of 450 pounds, and at a space velocity of about 10,000 over a catalyst prepared by reduction of a mixture of the oxides of copper and zinc containing copper and zinc in the weight ratio of about 1:2, the conversion of aldehyde averages over 99.5% for periods of at least 300 hours and more. The yield of alcohol obtained upon distillation of the resulting mixture is at least 93% and is usually about 98%.

The saturated aldehydes which may be hydrogenated according to this invention include, for instance, acetaldehyde, propionaldehyde, n-butyraldehyde, isobutyraldehyde, n-valeraldehyde, isovaleraldehyde, methylethylacetaldehyde, trimethylacetaldehyde, caproaldehyde, methyl-n-propylacetaldehyde, isohexaldehyde, enanthaldehyde, capryladehyde, 2-ethylhexanal, n-nonaldehyde, capraldehyde, hendecanal, dodecanal, tridecanal, myristic aldehyde, pentadecaldehyde, palmitic aldehyde, margaric aldehyde, stearic aldehyde, and the like. Other aldehydes included are those resulting from the carbonylation of a number of olefinic hydrocarbons, such as the straight chain olefins and also the branch chain olefins resulting from polymerization of lower olefins. Examples of the latter are the dimer, trimer, tetramer, pentamer, and hexamer of propylene; the dimers, trimers, and tetramers of butylene and isobutylene; and the dimers and trimers of the various amylenes.

The unsaturated aldehydes which may be hydrogenated according to this invention are, for example, acrolein, methacrolein, ethacrolein, crotonaldehyde, tiglic aldehyde, etc. Among the suitable hydroxy substituted aldehydes are glycolaldehyde, lactic aldehyde, hydracrylic aldehyde, aldol, beta-hydroxyisobutyraldehyde, glyceraldehyde, alpha, beta-dihydroxybutyraldehyde, etc. The outstanding examples of these unsaturated aldehydes and hydroxy-substituted aldehydes are the products resulting from carrying out an aldol condensation reaction involving either one or two compounds selected from among the saturated aliphatic aldehydes. This aldol condensation reaction may be represented by the general formula

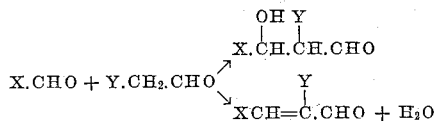

wherein X and Y may each represent either hydrogen, a straight chain alkyl group, or a branched-chain alkyl group. The compound represented by X.CHO may be the some as that represented by Y.CH$_2$.CHO or it may be different. This reaction is illustrated by the aldol condensation of 3,5,5-trimethylhexanal to give the highly branched chain compound of the formula (CH$_3$)$_3$C.CH$_2$.CH(CH$_3$).CH$_2$.CH=
   C(CHO).CH(CH$_3$).CH$_2$.C(CH$_3$)$_3$ As stated hereinbefore, the branched-chain, nine-carbon aldehyde compounds which are hydrogenated according to a preferred embodiment of this invention are those obtainable by reacting diisobutylene with carbon monoxide and hydrogen at elevated temperatures and pressures in the persence of a hydrogenation catalyst. Examples of such hydrogenation catalysts include nickel, cobalt, iron, copper, ruthenium and the like, as well as mixtures or compounds thereof. In place of the usual hydrogenation catalysts, various other catalysts, such as the metal carbonyls, the metal carbonyl complexes, and the soluble salts of the elements having an atomic number from 27 to 29 inclusive, may be used to advantage in carrying out carbonylation reactions of this sort.

A typical procedure for preparing these nine-carbon aldehydes is as follows. Commercial diisobutylene containing, as a catalyst, 0.05 weight percent cobalt in the form of cobalt naphthenate, is reacted with a gas mixture containing equal molar quantities of hydrogen and carbon monoxide. This gas mixture and the liquid diisobutylene containing the dissolved catalyst are compressed separately to 700 atmospheres, mixed and passed through a stainless steel tubular reactor which is completely immersed in a liquid heating medium maintained at 200° C. The reactants are introduced at rates such that the mol ratio of H$_2$:CO:diisobutylene is 1.1:1.1:1.0 and the contact time in the reactor is 10 minutes. The converter effluent is cooled and discharged to atmospheric pressure. The crude product produced at these conditions contains 63%, 3,5,5-trimethylhexanal, 12% miscellaneous material, 12% isooctane, and 13% unreacted diisobutylene, corresponding to 84% conversion of diisobutylene and 71% yield of 3,5,5-trimethylhexanal.

This crude product may be distilled, if desired, to produce substantially pure 3,5,5-trimethylhexanal. Alternatively it may be treated so as to produce a semi-refined aldehyde fraction. This latter treatment involves removal of the hydrocarbons by vacuum or steam distillation followed by flash distillation at 100° C. and 10 mm. to remove tars and carbonylation catalyst. A typical semi-refined aldehyde composition resulting from this treatment analyzes 77% 3,5,5-trimethylhexanal and 7.3% 3,5,5-trimethylhexanoic acid and has a refractive index, $n_D^{25°\ C.}=1.4237$ and a density

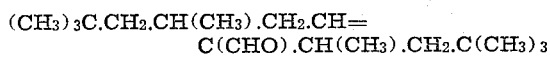

Either the crude, the semi-refined, or the refined aldehyde may be used as the raw material for the hydrogenation process of this invention. One advantage of using the crude or semi-refined fraction is that these fractions contain substances, in addition to the aldehyde itself, which are converted by hydrogenation to the alcohol, and the overall yield of alcohol is thereby increased. These substances include 3,5,5-trimethylhexanoic acid and 3,5,5-trimethylhexyl formate as well as various other esters, acetals, etc. An advantage of using the purified aldehyde is that it frequently makes possible the use of the copper-zinc oxide hydrogenation catalysts for longer periods of time than would otherwise be feasible.

Catalysts useful in the process of this invention are those comprising copper in a reduced form together with zinc oxide. Catalysts of this type and methods for preparing them are disclosed by A. T. Larson in U. S. Patent 1,797,426. The ratio of copper to zinc in the catalysts may vary within wide limits. A particularly satisfactory catalyst is one which contains about one atom equivalent of Cu to two atom equivalents of Zn (i. e. a weight ratio of Cu : Zn of approximately 1:2). This catalyst is preferably prepared by coprecipitating the metals as their carbonates from a solution containing soluble salts of copper and zinc in the proper proportions. The precipitate is then ignited to the metal oxides, formed into pellets, pills, granules, or the like, and reduced in hydrogen at 300° to 350° C.

The process of this invention may be carried out using a number of different types of apparatus. In one type of apparatus, the catalyst is disposed as a simple fixed bed within the converter and the preheated mixture of the aldehyde and hydrogen is passed over the catalyst in any suitable direction. In another type of apparatus, the catalyst is disposed in a series of trays within the converter, a preheated mixture containing the aldehyde and a portion of hydrogen is introduced into one end of the converter, and additional amounts of hydrogen are introduced at subsequent points along the converter. These additional amounts of hydrogen may be used to control the reaction temperature, if desired. In still another type of apparatus, the catalyst is in the form of a fluidized mass, which may be retained within the converter, or removed and recirculated. In any of these types of apparatus, preheating or vaporization of the feed may be achieved by contacting it with the equipment within which the exothermic hydrogenation reaction is taking place, or by any other suitable preheating means. The preheater, the converter, and other parts of the apparatus may be constructed of stainless steel, mild steel, etc.

The aldehyde is preferably vaporized by passing it down into a vaporization zone to which heat is supplied and at the same time passing up into said zone a portion or all of the hydrogen which is to be used in the reaction. The vapor pressure of the higher molecular weight aldehydes is relatively low, so that when the vaporization is carried out under the pressure to be employed in the hydrogenation step, it is frequently possible to control the concentration of such aldehydes in the reaction mixture by controlling the temperature at which the gases emerge from the vaporization zone. An advantage of this vaporization process, when applied to the higher aldehydes, is that it not only vaporizes, but it also purifies, the aldehyde. This is because impurities boiling considerably above the boiling point of the aldehyde, such as any remaining carbonylation catalyst, etc., are not vaporized under the prevailing conditions and may thus be removed as a liquid from the bottom of the vaporization zone. The process of this invention is not commercially attractive when applied to aldehydes containing more than twenty carbon atoms because of the impracticality of obtaining any appreciable amount of such high boiling compounds in the vapor phase.

After the reactants have been put through the converter, the product may be isolated in a convenient manner by passing the reaction mixture through suitable heat exchangers and coolers to a room temperature separator. This separator is generally operated at the pressure employed in the process, in order that the excess hydrogen which is separated out may be readily recycled to the reaction. The liquid product is removed from the separator either intermittently or continuously. Thereafter it may be purified by continuously distilling to remove low boilers and unreacted aldehyde, followed by flash distillation of the alcohol.

At temperatures below about 100° C., the process is not attractive because the rate of reaction is too slow, and because, in the case of the higher aldehydes, volatilization of the feed becomes difficult. Temperatures above 300° C. are generally to be avoided because the equilibrium of the reaction apparently becomes less favorable as the temperature is increased. Within the range of 100° to 300° C., however, and particularly within the range of 150° to 250° C., the reaction is remarkably insensitive to temperature variations. This is important because it means that there is usually no requirement that the temperature be controlled by removing heat as the reaction progresses. Furthermore, small variations in operating temperature within this range will not result in a decrease of the conversion or yield.

Conversion of the aldehyde to alcohol is generally more favored at higher pressures than at lower pressures, but even at atmospheric pressure the copper-zinc oxide catalysts are sufficiently active to give extremely good results. Since it is possible to obtain practically quantitative conversions at pressures ranging from about 200 to 600 pounds per square inch gauge, there is usually no advantage in operating at higher pressures.

Space velocities in excess of 200,000 volumes of gas (total volume of aldehyde plus hydrogen, at standard temperature and pressure) per volume of catalyst per hour are impractical, apparently because of the fact that equilibrium is not reached at such high rates of throughput. Space velocities below about 3000 permit the product to be exposed during unnecessarily long intervals to high temperatures at which it may become degraded. For practical reasons, space velocities of from 4,000 to 30,000 are preferred although these limits are not absolutely critical.

The ultimate limiting factor relative to the mol ratio of hydrogen to aldehyde is that there must be present an amount at least sufficient to convert all of the aldehyde to alcohol, i. e. at least 1 mol of hydrogen per mol of saturated aldehyde or per mol of hydroxy-substituted aldehyde, and at least 2 mols of hydrogen per mol of unsaturated aldehyde. For three reasons, however, a hydrogen : aldehyde ratio of at least 5:1 is employed herein. In the first place, an excess of hydrogen tends to drive the reaction to completion. Secondly, an appreciable amount of gaseous material is needed to make it possible to vaporize the feed in the case of the higher aldehydes, and hydrogen serves this purpose well. Thirdly, excess hydrogen reduces the temperature gradient by absorbing some of the heat of reaction. Excessive amounts of hydrogen are undesirable because they necessitate the use of bulky equipment. In practice, mol ratios of hydrogen : aldehyde within the range of from 15:1 to 60:1, have proved most useful. In addition to the hydrogen and aldehyde, inert materials which are gaseous under the reaction conditions may be present. For instance, when the hydrogen employed contains small amounts of nitrogen, and the unreacted hydrogen is continuously recycled to the process, the nitrogen concentration therein may build up appreciably. When the concentration of such inert materials becomes too great, they may be removed by purging.

Certain features of the process of this invention will be brought out by the following examples.

*Example 1.*—A refined aldehyde fraction is obtained by distilling a diisobutylene—CO—$H_2$ synthesis mixture. The distilled mixture analyzes about 95% aldehyde and contains from 1 to 3% of 3,5,5-trimethylhexanoic acid. This fraction is vaporized by passing it down into an annular vaporization zone surrounding the converter so that the heat required for vaporization is largely supplied by the heat of the hydrogenation reaction. The vaporization area is also provided with a jacket for controlling the temperature. Hydrogen gas which contains about 99.5% hydrogen and about 0.5% nitrogen, is introduced at the bottom of the vaporization area at a rate such that the mol per cent of aldehyde in the resulting vaporized mixture is 2.7%. This mixture is then passed down over a catalyst comprising reduced copper plus zinc oxide, in which the weight ratio of copper to zinc is approximately 1:2. The catalyst temperature is maintained at about 230° C., and the gas mixture is passed over it at a pressure of 450 pounds and at a total space velocity of 10,000. The reaction mixture is cooled and the unreacted hydrogen is separated therefrom. The conversion of aldehyde is quantitative, and the yield obtained, upon distillation, is 98%. At the end of a 300 hour run, there is no evidence of any decrease in catalyst activity.

The following table shows the effect of changing certain variables in the process described in Example 1.

*Table*

| Run No. | Temperature, °C. | Pressure, p. s. i. g. | Total Space Velocity | Mol per cent of Aldehyde in the feed | Per cent Conversion |
|---|---|---|---|---|---|
| 1 | 151 | 450 | 10,000 | 2.7 | 100.0 |
| 2 | 175 | 460 | 10,000 | 2.8 | 99.9 |
| 3 | 200 | 450 | 10,000 | 2.7 | 99.9 |
| 4 | 250 | 460 | 10,000 | 2.8 | 99.5 |
| 5 | 170 | 300 | 10,000 | 2.0 | 91.5 |
| 6 | 200 | 0 | 10,200 | 2.6 | 92.5 |
| 7 | 250 | 455 | 5,200 | 5.2 | 99.5 |
| 8 | 300 | 455 | 49,800 | 2.8 | 88.1 |
| 9 | 250 | 450 | 101,000 | 2.9 | 86.6 |
| 10 | 300 | 450 | 198,000 | 2.9 | 77.6 |

Runs 1 through 4 show the outstanding results which may be obtained over a wide temperature range while the other process variables are held at optimum levels. Runs 5 and 6 show that good results may be obtained at lower pressures, even down to one atmosphere (i. e., zero pounds per square inch gauge). Run 7 shows the use of a lower total space velocity and a lower mol ratio of hydrogen : aldehyde ( i. e. a higher mol per cent of aldehyde in the feed). Runs 8 through 10 show the progressively lower conversions obtained as the space velocity is greatly increased. The products obtained from all of these runs can be refined, either by vacuum distillation or by atmospheric pressure distillation, to give an alcohol which is 99.9% pure and which consists largely of 3,5,5-trimethylhexanol-1. This product is extremely useful as an intermediate for the synthesis of resin plasticizers, lubricants, oil additives, wetting agents and the like.

*Example 2.*—A process similar to that described in Example 1 is carried out in which a reduced copper-silica catalyst is employed in place of the reduced copper-zinc oxide catalyst. Relatively high conversions are obtained initially, but the catalyst activity drops off very rapidly, so that after 13 hours it is impossible to obtain conversions higher than 40%, even by raising the catalyst temperature to 310° C. Comparison of this result with those reported in Example 1 and the accompanying table shows the striking advantages of the reduced copper-zinc oxide catalysts.

*Example 3.*—A process similar to that described in Example 1 is carried out in which the aldehyde hydrogenated is acetaldehyde. Ethanol is obtained in substantially quantitative conversion and yield, and there is no indication of decreased catalyst activity after several hundred hours of operation.

*Example 4.*—A process similar to that described in Example 1 is carried out in which the aldehyde hydrogenated is the $C_{18}$ aldehyde resulting from the aldol condensation of 3,5,5-trimethylhexanal. The aldehyde concentration in the feed is about 1.0 mol per cent. The main ingredient of the product is the compound, 2-(1,3,3-trimethylbutyl)-5,7,7-trimethyloctanol-1. Conversions average about 90%, and the catalyst life is excellent.

The process of this invention provides a very practical method for obtaining high yields of alcohols. Attempts have been made to carry out this type of hydrogenation reaction using various catalysts other than those disclosed herein, but none of the other catalysts, whether employed in a liquid-phase process or in a vapor-phase process, have even approached the desirable results which are obtained by using copper-zinc oxide catalysts under the prescribed operating conditions. A particularly important feature of the present invention is that the catalysts may be used for long periods of time without losing their activity. Runs of as much as 300 hours and more have been made in which there was no evidence of any decrease in catalyst activity.

Since many modifications of the process of this invention may be made without departing from the spirit and scope thereof, it is not intended that the invention should be limited in any way other than by the appended claims.

I claim:

1. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone from 15 to 60 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 150° to 250° C., at a pressure of from 200 to 600 pounds per square inch gauge, and at a space velocity of from 4,000 to 30,000 volumes of gas per volume of catalyst per hour, over a catalyst comprising reduced copper plus zinc oxide.

2. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone about 50 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 150° to 250° C., at a pressure of from 200 to 600 pounds per square inch gauge, and at a space velocity of from 4,000 to 30,000 volumes of gas per volume of catalyst per hour, over a catalyst comprising reduced copper plus zinc oxide.

3. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone from 15 to 60 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 170° to 230° C., at a pressure of from 200 to 600 pounds per square inch gauge, and at a space velocity of from 4,000 to 30,000 volumes of gas per volume of catalyst per hour, over a catalyst comprising reduced copper plus zinc oxide.

4. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone from 15 to 60 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 150° to 250° C., at a pressure of about 450 pounds per square inch gauge, and at a space velocity of from 4,000 to 30,000 volumes of gas per volume of catalyst per hour, over a catalyst comprising reduced copper plus zinc oxide.

5. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone from 15 to 60 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 150° to 250° C., at a pressure of from 200 to 600 pounds per square inch gauge, and at a space velocity of about 10,000 volumes of gas per volume of catalyst per hour, over a catalyst comprising reduced copper plus zinc oxide.

6. A process for preparing 3,5,5-trimethylhexanol-1 by hydrogenating 3,5,5-trimethylhexanal in the vapor phase, which comprises vaporizing the 3,5,5-trimethylhexanal by passing it down into a vaporization zone, at the same time passing up into said zone from 15 to 60 mols of hydrogen per mol of 3,5,5-trimethylhexanal introduced, controlling the concentration of 3,5,5-trimethylhexanal in the vapor phase by controlling the amount of heat provided to the vaporization zone, and then passing the vaporous mixture thus obtained, at a temperature within the range of from 150° to 250° C., at a pressure of from 200 to 600 pounds per square inch gauge, and at a space velocity of from 4,000 to 30,000 volumes of gas per volume of catalyst per hour, over a catalyst containing copper and zinc in the weight ratio of about 1:2, said catalyst having been prepared by reducing a mixture of copper and zinc oxides with hydrogen.

7. A process for preparing 3,5,5-trimethylhexanol-1 by hydrogenating 3,5,5-trimethylhexanal in the vapor phase, which comprises vaporizing the 3,5,5-trimethylhexanal by passing it down into an annular vaporization zone surrounding a converter, at the same time passing up into said zone from 15 to 60 mols of hydrogen per mol of 3,5,5-trimethylhexanal introduced, utilizing the heat of the hydrogenation reaction occurring within said converter to supply a large portion of the heat required for vaporization of the 3,5,5-trimethylhexanal, controlling the concentration of 3,5,5-trimethylhexanal in the vapor phase by controlling the amount of heat provided to the vaporization zone, and then passing the vaporous mixture thus obtained into said converter containing a catalyst comprising reduced copper plus zinc oxide, at a temperature within the range of from 150° to 250° C., at a pressure of from 200 to 600 pounds per square inch gauge, and at a space velocity of from 4,000 to 30,000 volumes of gas per volume of catalyst per hour.

8. A process for preparing 3,5,5-trimethylhexanol-1 by hydrogenating 3,5,5-trimethylhexanal in the vapor phase, which comprises vaporizing the 3,5,5-trimethylhexanal by passing it down into an annular vaporization zone surrounding a converter, at the same time passing into said zone about 50 mols of hydrogen per mol of 3,5,5-trimethylhexanal introduced, utilizing the heat of the hydrogenation reaction occurring within said converter to supply a large portion of the heat required for vaporization of the 3,5,5-trimethylhexanal, controlling the concentration of 3,5,5-trimethylhexanal in the vapor phase by controlling the amount of heat provided to the vaporization zone, and then passing the vaporous mixture thus obtained into said converter containing a catalyst comprising copper and zinc in the weight ratio of about 1:2, at a temperature within the range of from 170° to 230° C., at a pressure of about 450 pounds per square inch gauge, and at a space velocity of about 10,000 volumes of gas per volume of catalyst per hour, said catalyst having been prepared by reducing a mixture of copper and zinc oxides with hydrogen.

9. A process for preparing 3,5,5-trimethylhexanol-1 by hydrogenating 3,5,5-trimethylhexanal which process comprises hydrogenating said 3,5,5-trimethylhexanal in the vapor phase by passing it, together with from 15 to 60 mols of hydrogen per mol of 3,5,5-trimethylhexanal, at a temperature of from 150° to 250° C., at a pressure of from 200 to 600 pounds per square inch gauge, and at a space velocity of from 4,000 to 30,000 volumes of gas per volume of catalyst per hour, over a catalyst comprising reduced copper plus zinc oxide, said catalyst having been prepared by a process comprising coprecipitating the metals as their carbonates from a solution containing soluble salts of copper and zinc, igniting the precipitate to the metal oxides and then reducing in hydrogen at 300° to 350° C.

RICHARD E. BROOKS.

REFERENCES CITED

The following references are of record in the file of this patent:

UNITED STATES PATENTS

| Number | Name | Date |
| --- | --- | --- |
| 1,724,761 | Holden | Aug. 13, 1929 |
| 2,060,267 | Toussaint | Nov. 10, 1936 |
| 2,079,414 | Lazier | May 4, 1937 |
| 2,275,152 | Lazier | Mar. 3, 1942 |
| 2,327,066 | Roelen | Aug. 17, 1943 |
| 2,437,600 | Gresham et al. | Mar. 9, 1948 |

FOREIGN PATENTS

| Number | Country | Date |
| --- | --- | --- |
| 316,399 | Great Britain | Aug. 1, 1929 |
| 417,582 | Great Britain | Jan. 2, 1933 |
| 427,368 | Great Britain | Apr. 23, 1935 |
| 873,391 | France | July 7, 1942 |

OTHER REFERENCES

Willemart: Bull. Soc. Chem., 5ᵉ Serie, T. 14, 1947, Memories, pages 152–157.